UNITED STATES PATENT OFFICE.

JAMES M. ALLEN AND JOSEPH C. CHRISTEN, OF ST. LOUIS, MISSOURI; SAID CHRISTEN ASSIGNOR TO ORION S. MILLER, OF ST. LOUIS, MISSOURI.

CEMENTATION COMPOUND.

1,226,739.      Specification of Letters Patent.      Patented May 22, 1917.

No Drawing.      Application filed September 15, 1916. Serial No. 120,250.

*To all whom it may concern:*

Be it known that we, JAMES M. ALLEN and JOSEPH C. CHRISTEN, citizens of the United States, residing in St. Louis, State of Missouri, have invented a new and useful Cementation Compound, of which the following is a specification.

Our invention relates to a composition of matter to be used for the treatment of steel and iron by the cementation method or process, the principal object of our invention being to provide a comparatively simple composition of matter which can be cheaply produced and which when properly used will render the treated metal comparatively hard and tough. Metal treated with our improved composition has great wear resisting qualities and is, therefore, particularly adapted for use in the manufacture of all forms of tools, gear wheels, machine parts, car wheels, and the like.

Our improved composition consists of a mixture of pulverized anthracite coal, pulverized animal bones, pulverized carbonized vegetable material, preferably potatoes, and pulverized manganese.

In preparing the composition we prefer to use ingredients in about the following proportions: $31\frac{1}{2}$ per cent. pulverized anthracite coal, $31\frac{1}{2}$ per cent. pulverized animal bones, $31\frac{1}{2}$ per cent. pulverized vegetable material, preferably potatoes, and $5\frac{1}{2}$ per cent. pulverized manganese. It will be understood, of course, that these proportions may be varied slightly according to the metal under treatment, and the requirements or the use to which said metal is to be put. In some instances 30 per cent. of each of the principal ingredients can be used and this increases the proportion of manganese to 10 per cent.

In the use of our improved composition the ingredients are thoroughly mixed together and the piece of metal to be treated is placed in a suitable container with the composition packed around said piece of metal or packed around and over the particular surface or part to be treated. The container thus packed is now subjected to heat of a temperature ranging from 800 deg. to 1400 deg., depending, of course, upon the size of the piece of metal under treatment and the degree of hardness which it is desired to impart thereto.

Our improved composition is capable of being repeatedly used in the cementation process of treating metal, it only being necessary to add to the reused composition a comparatively small quantity of fresh or unused composition.

Steel treated with our improved composition is comparatively hard and tough and is therefore particularly adapted for use in the manufacture of drills, bits, all forms of metal-working tools, machine parts, gear wheels, car wheels, and the like.

We claim—

1. The herein described composition of matter to be used for the treatment of steel and iron by the cementation method or process comprising substantially equal parts of pulverized anthracite coal, pulverized animal bones, pulverized carbonized vegetable material and a comparatively small portion of pulverized manganese.

2. The herein described composition of matter to be used for the treatment of steel and iron by the cementation method or process comprising from 30 to 32 per cent. pulverized anthracite coal, from 30 to 32 per cent. pulverized animal bones, from 30 to 32 per cent. pulverized carbonized vegetable material, and from 4 to 10 per cent. pulverized manganese.

3. The herein described composition of matter to be used for the treatment of steel and iron by the cementation method or process comprising from 30 to 32 per cent. pulverized anthracite coal, from 30 to 32 per cent. pulverized animal bones, from 30 to 32 per cent. pulverized carbonized potatoes, and from 4 to 10 per cent. pulverized manganese.

In testimony whereof we hereunto affix our signatures in the presence of a witness, this 11th day of September, 1916.

JAMES M. ALLEN.
    JOSEPH C. CHRISTEN.

Witness:
    M. P. SMITH.

Copies of this patent may be obtained for five cents each, by addressing the "Commissioner of Patents, Washington, D. C."